April 14, 1942.  T. A. DAVENPORT  2,279,704
WHEEL ASSEMBLY AND COVER THEREFOR
Filed Aug. 5, 1939  2 Sheets-Sheet 1
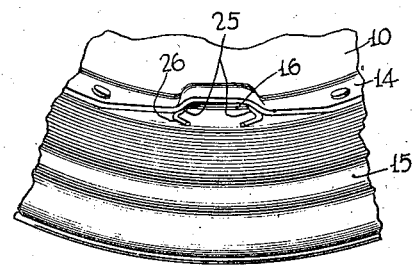
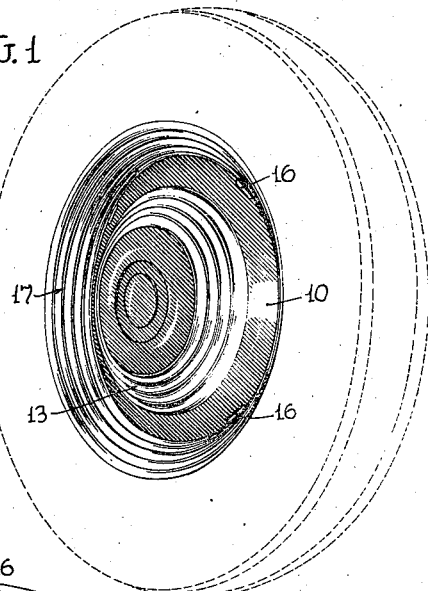
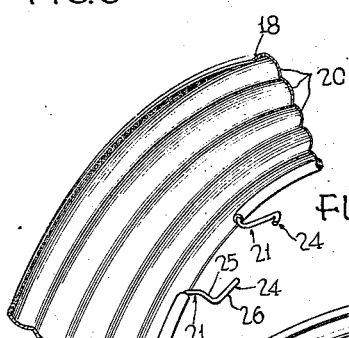
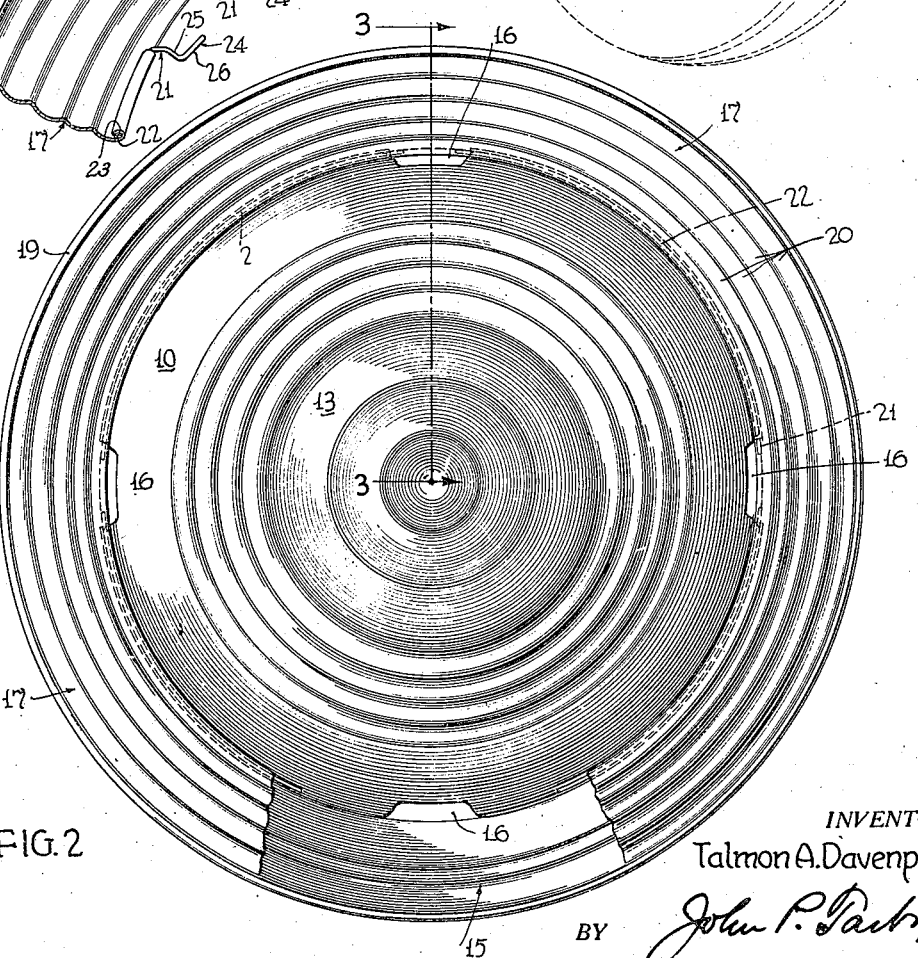
INVENTOR
Talmon A. Davenport
BY John P. Tarbox
ATTORNEY April 14, 1942.      T. A. DAVENPORT      2,279,704
WHEEL ASSEMBLY AND COVER THEREFOR
Filed Aug. 5, 1939      2 Sheets-Sheet 2
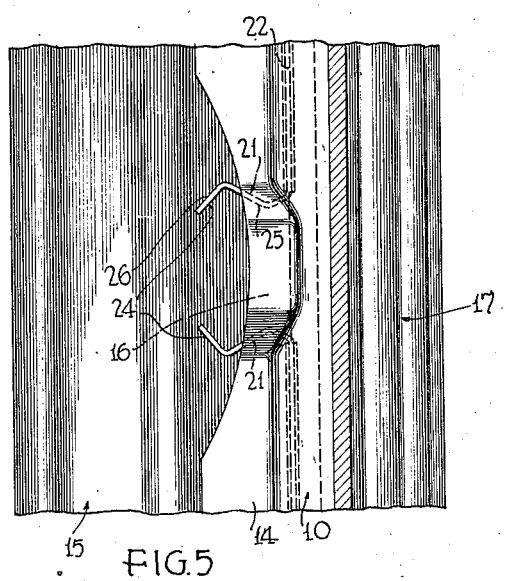
FIG.5
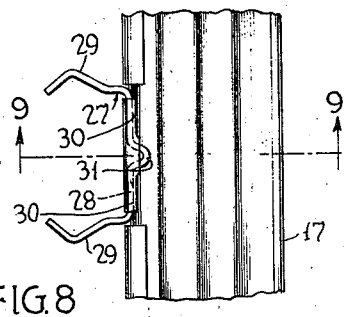
FIG.8
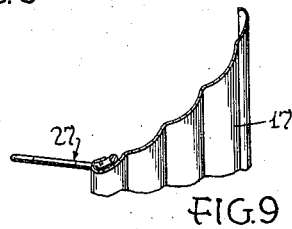
FIG.9
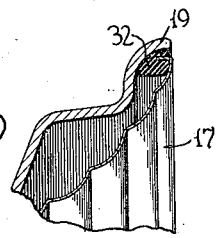
FIG.10
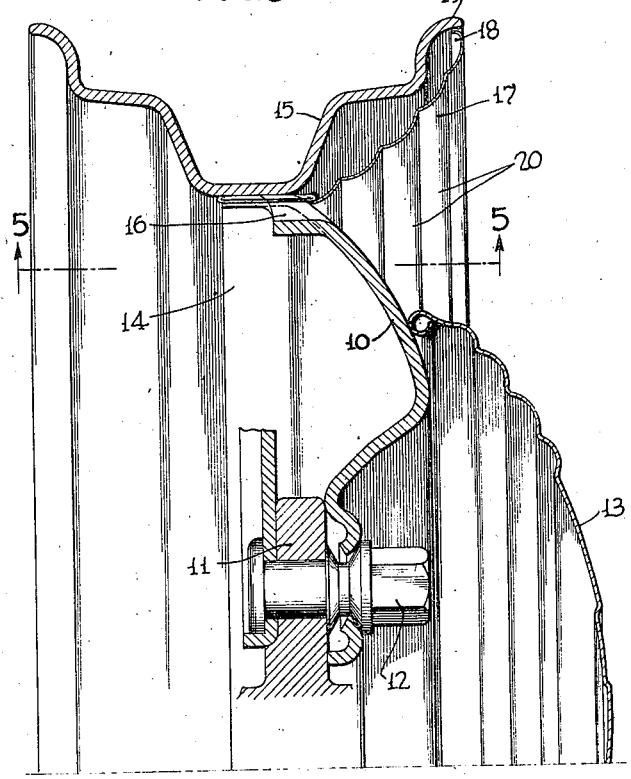
FIG.3
FIG.4
INVENTOR
Talmon A. Davenport
BY John P. Täibrp
ATTORNEY Patented Apr. 14, 1942

2,279,704

UNITED STATES PATENT OFFICE 2,279,704

WHEEL ASSEMBLY AND COVER THEREFOR

Talmon A. Davenport, Detroit, Mich., assignor to Budd Wheel Company, Philadelphia, Pa., a corporation of Pennsylvania Application August 5, 1939, Serial No. 288,487

6 Claims. (Cl. 41—10)

The invention relates to wheel covers and more particularly to such covers adapted to be secured to the periphery of a wheel. More specifically, the invention is directed to the securement of a trim ring to cover the outer face of the rim.

It is an object of my invention to provide a cover or trim ring and securing means therefore which permits the cover to be easily snapped into place and when in place it is securely held.

Another object of my invention is to provide a cover and securing means therefore which is simple in construction and economical to manufacture and at the same time ornamental in appearance.

These and other objects and advantages and the manner in which they are attained will become apparent from the following detailed description when read in connection with the drawings forming a part of this specification.

In the drawings:

Fig. 1 is a front perspective view of a wheel having the invention applied thereto.

Fig. 2 is an enlarged front elevational view, thereof with parts of the cover broken away.

Fig. 3 is an enlarged sectional view through the upper wheel half, the section being taken as indicated by the line 3—3 of Fig. 2.

Fig. 4 is a view similar to Fig. 3 showing a segment of the cover or trim ring detached.

Fig. 5 is a fragmentary sectional view through the wheel as indicated by the line 5—5 of Fig. 3.

Fig. 6 is a fragmentary view of a portion of the periphery of the wheel as seen from the rear.

Fig. 7 is a fragmentary perspective view of the ring as seen from the rear.

Fig. 8 is a fragmentary plan view of a modified ring.

Fig. 9 is a fragmentary sectional view taken as indicated by the line 9—9 of Fig. 8.

Fig. 10 is a fragmentary sectional view showing the periphery of the ring provided with cushioning means.

The invention has been shown applied to a wheel having a sheet metal body 10 of the disc type secured to radial hub flange 11, by securing bolts, as 12. The central portion of the wheel may be covered by a hub cap as 13 secured in any manner (not shown).

At its periphery the wheel body is formed with the usual lateral flange 14 upon which is seated and secured the rim 15, in this case of the usual drop center type.

Adjacent the rim the disc body is formed with a number of circumferentially spaced wide slots 16 which may be the usual anti-skid chain securing slots although the openings between spokes in the case of a spoked wheel body would serve equally well for the purposes of the present invention.

In the present embodiment, the slotted openings 16 are formed as circumferentially wide radially narrow slots, the radially outer side of which is formed by the base of the rim 15 and the sides of the slots are inclined outwardly circumferentially toward the rim, see Fig. 2 forming a relatively sharp angle between the sides of the slot and the rim base.

The ornamental ring 17, according to this embodiment of the invention, comprises a generally frusto-conical annulus of sheet metal designed to extend from its outer margin, having an inturned flange 18 disposed beneath the outer edge flange 19 of the rim, to its inner margin seated against the wheel body 10. Thus it masks the entire outer face of the rim and the outer periphery of the wheel body upon which the rim seats. In cross section, this annulus may have any desired ornamental configuration. In the instant case, it is shown formed with a plurality of shallow beaded formations 20 of substantially uniform width and the outer periphery of the hub cap is similarly contoured, thus giving a very pleasing appearance to the ensemble.

Since, in manufacturing, the location between wheel body and rim may be held fairly constant, but the rim profile may vary considerably with relation to the wheel body, the trim ring is formed and secured so that it seats against the wheel body only, while its outer margin may be slightly spaced from the outer edge flange 19 of the rim. This slight spacing does not detract at all from the appearance, and permits the securing means to act more efficiently.

To secure the cover ring to the wheel, there are provided on its inner margin a plurality of spring clips 21. As shown in Figs. 1 to 7 the clips may be fabricated from suitable spring wire, and each clip comprises an arcuate base portion 22 conforming to the inner margin of the ring and secured thereto by a rolled over bead 23 and laterally extending portions 24 extending axially inwardly and with angularly related cam portions 25 and 26. The laterally extending portions 24 are spaced apart so that their inner cam portions 25 engage in the angle formed between the sides of the slots 16 and the rim base with a wedging action to securely hold the ring in place with its inner margin bottoming on the wheel body.

The ring is moved into secured position by forcing it axially toward the wheel body, the outer cam portion 26 of the clips engaging the sides of the slots and being cammed aside by the axial pressure on the ring until the apices of the angles formed by the cam portions 25 and 26 snap past the side edges of the slots, when the oppositely inclined cam portions 25 come into play to lock the cover securely on the wheel.

The cover can be readily removed by releasing the clips from the inside of the wheel or by inserting a suitable prying tool under the margin of the rim, and prying it off from the outside.

In the modification of Figs. 8 and 9, the U-shaped clips 27 have a relatively short base portion 28 extending about the width of a slot 16, the laterally extending portions 29 of each clip being adapted to cooperate with the opposite sides of a slot similarly to the portions 24. In this case the base 28 of the clip is again secured to the inner margin of ring 17 by spaced rolled over beads 30 arranged on opposite sides of a U bend 31 in the base portion which U bend cooperates with the body of the ring to hold the clip in axially extended position as shown in Fig. 9.

If desired, the outer margin of the ring may be provided with a spacer of rubber or other suitable sound deadening material, see Fig. 10, this spacer preventing metal to metal contact between the ring and the rim and avoiding possibility of noise due to such engagement.

It will be understood that while the invention has been shown and described as applied to a rim cover, it is suitable for use with other types of covers associated with the outer face of a wheel and such covers are intended to be included within the spirit and scope of the appended claims.

What I claim is:

1. In combination with a disc wheel body and rim assembly having spaced circumferentially extending slots adjacent the periphery of said assembly with the rim forming the outer wall of said slots, of an ornamental ring applied to the outside face of said disc and rim assembly and wire spring clips having arcuate base portions conforming in curvature to the curvature of a margin of the ring, and laterally extending locking projections, the base portions being positively locked to said margin of the ring by curled-over portions of said margin and the laterally projecting portions having interlocking engagement with the circumferentially spaced sides of the slots to hold the ring in place.

2. In combination with a disc wheel body and a rim secured thereto, said wheel body having circumferentially spaced openings formed therein, of a trim ring having an outer peripheral portion extending under the outer margin of the rim and an inner peripheral portion seated against the disc, said inner peripheral portion carrying spring clips engaging the circumferentially spaced sides of the openings to secure the ring in place.

3. In combination with a wheel body and rim assembly, said assembly having circumferentially spaced openings between the wheel body and rim, of an ornamental cover masking at least a portion of the outer face of said assembly, and spring clips each having an arcuate base portion conforming to the curvature of, and secured to, a peripheral margin of said cover by a rolled over portion of said margin positively locking said base portion to the cover, and laterally projecting locking portions from said base portion engaging the circumferentially spaced sides of said openings to secure the cover in place.

4. In combination with a wheel body and rim assembly, said wheel body having spaced openings in its periphery adjacent the rim, of an ornamental trim ring having its outer margin disposed under a portion of the rim, the inner margin of said ring having securing clips arranged to engage the circumferentially spaced sides of said openings with a cam action to seat the inner margin of the ring firmly against the wheel body and rim assembly.

5. The combination according to claim 4 in which cushioning means to prevent metal to metal contact are provided between the outer margin of the ring and the rim.

6. The combination according to claim 1 in which the sides of the slots each terminate in acute angles with the apices of which the clips wedgingly engage.

TALMON A. DAVENPORT.